(12) United States Patent
Tamura (10) Patent No.: US 6,275,845 B1
(45) Date of Patent: Aug. 14, 2001

(54) COLLECTIVE COMMUNICATION APPARATUS IN MULTIPROCESSOR SYSTEM

(75) Inventor: Masanori Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/177,971

(22) Filed: Oct. 26, 1998

(30) Foreign Application Priority Data

Oct. 24, 1997 (JP) .................................................. 9-310028

(51) Int. Cl.[7] .................................................. G06F 15/16
(52) U.S. Cl. .................... 709/106; 712/220; 712/225; 712/20; 709/200; 709/213; 709/212; 709/236
(58) Field of Search ...................... 712/10–17, 20–22, 712/28–33, 201; 709/100, 101, 102, 106, 200, 201, 202, 204, 205, 213, 230, 232, 233, 310, 319, 328, 329, 710

(56) References Cited

U.S. PATENT DOCUMENTS

| 4,814,979 | * | 3/1989 | Neches | 709/106 |
|---|---|---|---|---|
| 5,371,896 | * | 12/1994 | Gove et al. | 712/20 |
| 5,440,687 | * | 8/1995 | Coleman et al. | 709/236 |
| 5,673,423 | * | 9/1997 | Hillis | 709/400 |
| 5,828,894 | * | 10/1998 | Wilkinson | 712/20 |
| 5,948,060 | * | 9/1999 | Gregg et al. | 709/212 |
| 6,047,323 | * | 4/2000 | Krause | 709/227 |

OTHER PUBLICATIONS

Kirk L. Johnson, "The impact of Communication Locality on Large–Scale Multiplrocessor Performance," Proceedings of the 19th Annual International Symposium on Computer Architecture; pp. 392–402, May, 1992, Queenland Australia.*

* cited by examiner

*Primary Examiner*—Meng-Al T. An
*Assistant Examiner*—Wen-Tai Lin
(74) *Attorney, Agent, or Firm*—Sughrue, Mion, Zinn, Macpeak & Seas, PLLC (57) ABSTRACT

A collective communication apparatus in a multiprocessor system which shortens communication processing time by reducing data transfer that utilizes communication paths of low performance includes a processor group defining unit for defining groups of processors, from a plurality of processors connected by communication paths of various performance levels, that are capable of implementing data transfer on a communication path or paths of equal performance levels, and creating lists of these processor groups; a master-processor registration updating unit for updating the lists by a root processor designation included in a communication request; a collective communication execution control unit for controlling, depending upon the type of collective communication, the order in which the lists are executed; and a list-referring collective communication execution unit for performing collective communication with specific processors using the lists.

9 Claims, 7 Drawing Sheets

COLLC:COLLECTIVE  COMMN:COMMUNICATION  PERF:PERFORMANCE

COMMN: COMMUNICATION     PERF: PERFORMANCE (a) STEP 1

```
COMMN PATH (PERF LEVEL 3)
├── COMMN PATH (PERF LEVEL 2)
│     ├── COMMN PATH (PERF LEVEL 1) — a b c d
│     └── COMMN PATH (PERF LEVEL 1) — e f g h
└── COMMN PATH (PERF LEVEL 2)
      ├── COMMN PATH (PERF LEVEL 1) — i j k l
      └── COMMN PATH (PERF LEVEL 1) — m n o p
```

(b) STEP 2

```
COMMN PATH (PERF LEVEL 3)
├── COMMN PATH (PERF LEVEL 2)
│     ├── COMMN PATH (PERF LEVEL 1) — a b c d
│     └── COMMN PATH (PERF LEVEL 1) — e f g h
└── COMMN PATH (PERF LEVEL 2)
      ├── COMMN PATH (PERF LEVEL 1) — i j k l
      └── COMMN PATH (PERF LEVEL 1) — m n o p
```

(c) STEP 3

```
COMMN PATH (PERF LEVEL 3)
├── COMMN PATH (PERF LEVEL 2)
│     ├── COMMN PATH (PERF LEVEL 1) — a b c d
│     └── COMMN PATH (PERF LEVEL 1) — e f g h
└── COMMN PATH (PERF LEVEL 2)
      ├── COMMN PATH (PERF LEVEL 1) — i j k l
      └── COMMN PATH (PERF LEVEL 1) — m n o p
```

(d) STEP 4

```
COMMN PATH (PERF LEVEL 3)
├── COMMN PATH (PERF LEVEL 2)
│     ├── COMMN PATH (PERF LEVEL 1) — a b c d
│     └── COMMN PATH (PERF LEVEL 1) — e f g h
└── COMMN PATH (PERF LEVEL 2)
      ├── COMMN PATH (PERF LEVEL 1) — i j k l
      └── COMMN PATH (PERF LEVEL 1) — m n o p
```

FIG. 7  PRIOR ART

(a) STEP 1

(b) STEP 2

(c) STEP 3

(d) STEP 4

● : PROCESSOR POSSESSING DATA

○ : PROCESSOR WAITING FOR DATA

COLLECTIVE COMMUNICATION APPARATUS IN MULTIPROCESSOR SYSTEM

FIELD OF THE INVENTION

This invention relates to a communications apparatus in a multiprocessor system in which a plurality of processors are connected by communication paths having a variety of performance levels. More particularly, the invention relates to a collective communication apparatus in which a plurality of processors participate in communication and data is scattered and/or gathered.

BACKGROUND OF THE INVENTION

Collective communication in which a plurality of processors participate can be divided into scatter collective communication, in which one processor serving as a root scatters data to all other processors, and gather collective communication, in which one processor serving as the root gathers data from all processors. Data is sent and received between the root processor and other processors in both of types of collective communication. If this is realized in simple fashion, data need only be sent individually between the root processor and other processors.

Figure 7:
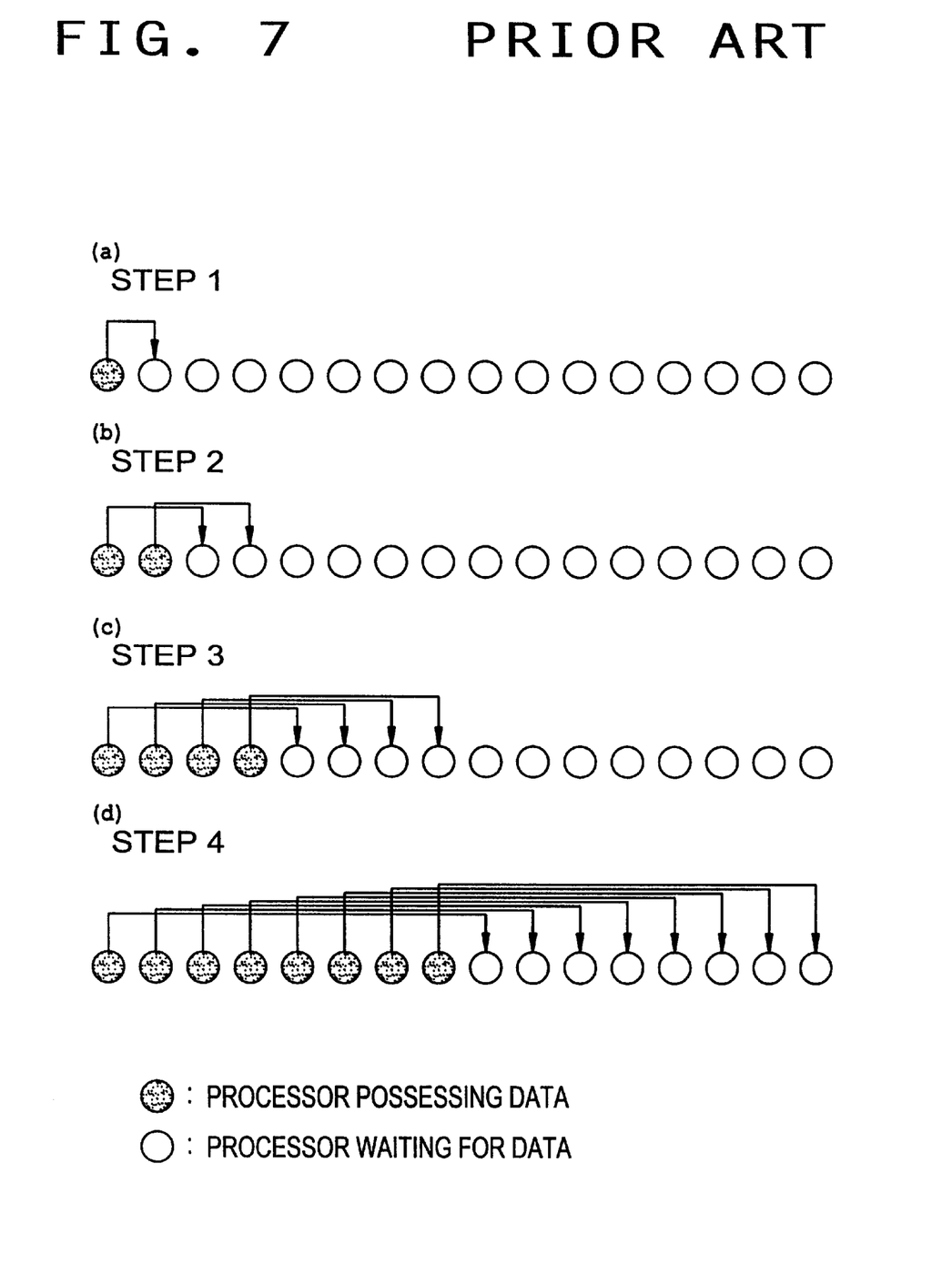
FIG. 7 is a diagram, which is useful in describing the prior art, showing schematically, on a step-by-step basis, conditions when data is expanded by the binary-tree approach applied to all processors of a multiprocessor system.

When such processing is actually carried out, however, the processors execute communication serially, the result of which is greatly degraded performance. In general, therefore, collective communication is performed through parallel processing as much as possible by using a binary-tree approach. More specifically, as shown in FIG. 7, which illustrates schematically the scattering of data in scatter collective communication, it is known that the expansion and gathering of data in a plurality of processors proceed in steps of the square of 2, whereby high-speed processing can be achieved. The system comprises 16 processors, among which those indicated by the black circles are processors that possess data and those indicated by the white circles are processor that wait for data. At step 1, the first data possessing processor, which is located at the extreme left, delivers data to the neighboring second processor by communicating with this processor. At step 2, the first and second processors possessing data each skip one processor to communicate with third and fourth processors, respectively, that are waiting for data. As a result, the first through fourth processors come to possess data. Thus, at step 4, the eight processors on the left side communicate with the eight processors on the right side. As a result, all 16 processors come to possess data in four steps.

SUMMARY OF THE DISCLOSURE

However, if there is a difference in the data transfer capability of the communication paths that connect the plurality of processors participating in collective communication, there will be instances where communication concentrates in the communication path having the lowest transfer performance, depending upon how the participating processors are arranged in the binary tree. This invites a decline in the performance of collective communication.

Thus, if there is a difference in the data transfer performance of the communication paths that connect a plurality of processors when collective communication is carried out using the binary-tree approach as is for all processors of a multiprocessor system, communication may concentrate in the communication path having the lowest transfer performance. The result can be degraded collective communication performance.

Accordingly, an object of the present invention is to provide a collective communication apparatus, system or method in which a decline in communications performance is mitigated in collective communication in a multiprocessor system.

Other objects of the present invention will become apparent in the entire disclosure.

According to one aspect of the present invention, the foregoing object is attained by providing a collective communication apparatus in a multiprocessor system constituted by a plurality of processors connected by communication paths having various performance levels, comprising processor group defining means, master-processor registration updating means, collective communication execution control means, and list-referring collective communication execution means. The processor group defining means defines sets of processors or of previously decided master processors, which participate in program execution and are connected by communication paths of the same performance levels when collective communication is executed, as processor groups in dependence upon the performance levels of the communication paths, to create processor group lists on a per-performance level basis upon deciding a provisional master processor in any of the groups of processors. The master-processor registration updating means updates the created processor group lists in such a manner that a root processor specified by a collective communication request will become a master processor. The collective communication execution control means presents the lists in order of increasing performance if the collective communication request is a scatter request, and/or in order of decreasing performance if the collective communication request is a gather request. The list-referring collective communication execution means refers to the list delivered from the collective communication execution control means and, if its own processor is included in any of the lists, performing collective communication with all processors included in the list.

According to a second aspect of the present invention, there is provided a collective communication apparatus in a multiprocessor system constituted by a plurality of processors connected by communication paths having various performance levels, wherein each processor comprises:

(a) processor group defining means for defining processor groups, each of which comprises processors capable of implementing data transfer on a communication path of the same performance level, from the plurality of processors connected by the communication paths having various performance levels, and creating lists of processor groups on a per-performance basis in terms of the communication paths;

(b) collective communication execution control means for controlling/deciding, in dependence upon type of collective communication and on the basis of the lists, the order in which communication is executed; and (c) list-referring collective communication execution means for referring to the lists and performing collective communication with the processors in accordance with the order controlled/decided by the collective communication execution control means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A mode for practicing the present invention will be described below.

In a preferred embodiment of the present invention, there is provided a multiprocessor system constituted by a plurality of processors connected by communication paths having a variety of performance levels, wherein each processor has a processor group defining unit 211, master-processor registration updating unit 212, collective communication execution control unit 213, and list-referring collective communication execution unit 214. The processor group defining unit (211 in FIG. 2) defines, as processor groups in dependence upon the performance levels of the communication paths when collective communication is carried out, sets of processors each comprising processors, or previously defined provisional master processors, participating in collective communication and connected by communication paths of uniform performance levels, advancing this processing while deciding provisional master processors the number of which is equal to the number of performance levels existing in the system, and creating performance level lists in memory on a per-performance level basis. The master-processor registration updating unit (212 in FIG. 2) updates the processor group lists in memory in such a manner that a root processor specified by a collective communication request will become the true master processor. The collective communication execution control unit (213 in FIG. 2) delivers the lists, to a list-referring collective communication execution unit (214 in FIG. 2), in order of increasing performance, namely from a list of groups of processors connected by communication paths of lower performance to a list of groups of processors connected by communication paths of higher performance if the collective communication request is a scatter-type request, and in order of decreasing performance, namely from a list of groups of processors connected by communication paths of higher performance to a list of groups of processors connected by communication paths of lower performance, if the collective communication request is a gather-type request. The list-referring collective communication execution unit (214 in FIG. 2) refers to the delivered lists and, if its own processor is included in any of the delivered lists, performing collective communication with the other processors included in the list.

In this mode of practicing the present invention, execution of collective communication is broken into parts on the basis of individual processor groups in which the processors are connected by communication paths of more uniform communication performance. As a result, communication using the lower speed communication paths in the system can be held to the minimum, thereby improving the performance of collective communication.

A preferred embodiment of the present invention will now be described in detail with reference to the drawings.

Figure 1:
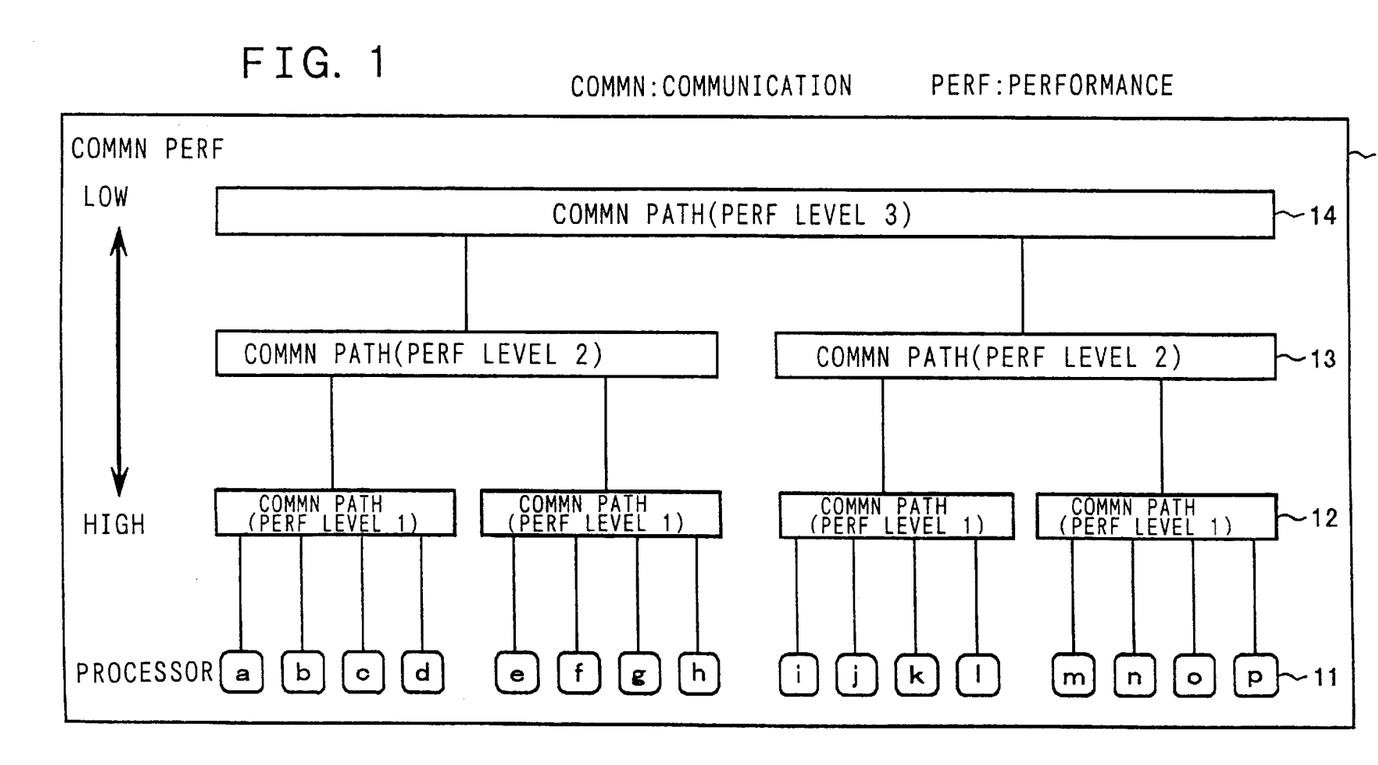
FIG. 1 is a block diagram illustrating the configuration of a system for practicing a mode of the present invention.
Figure 2:
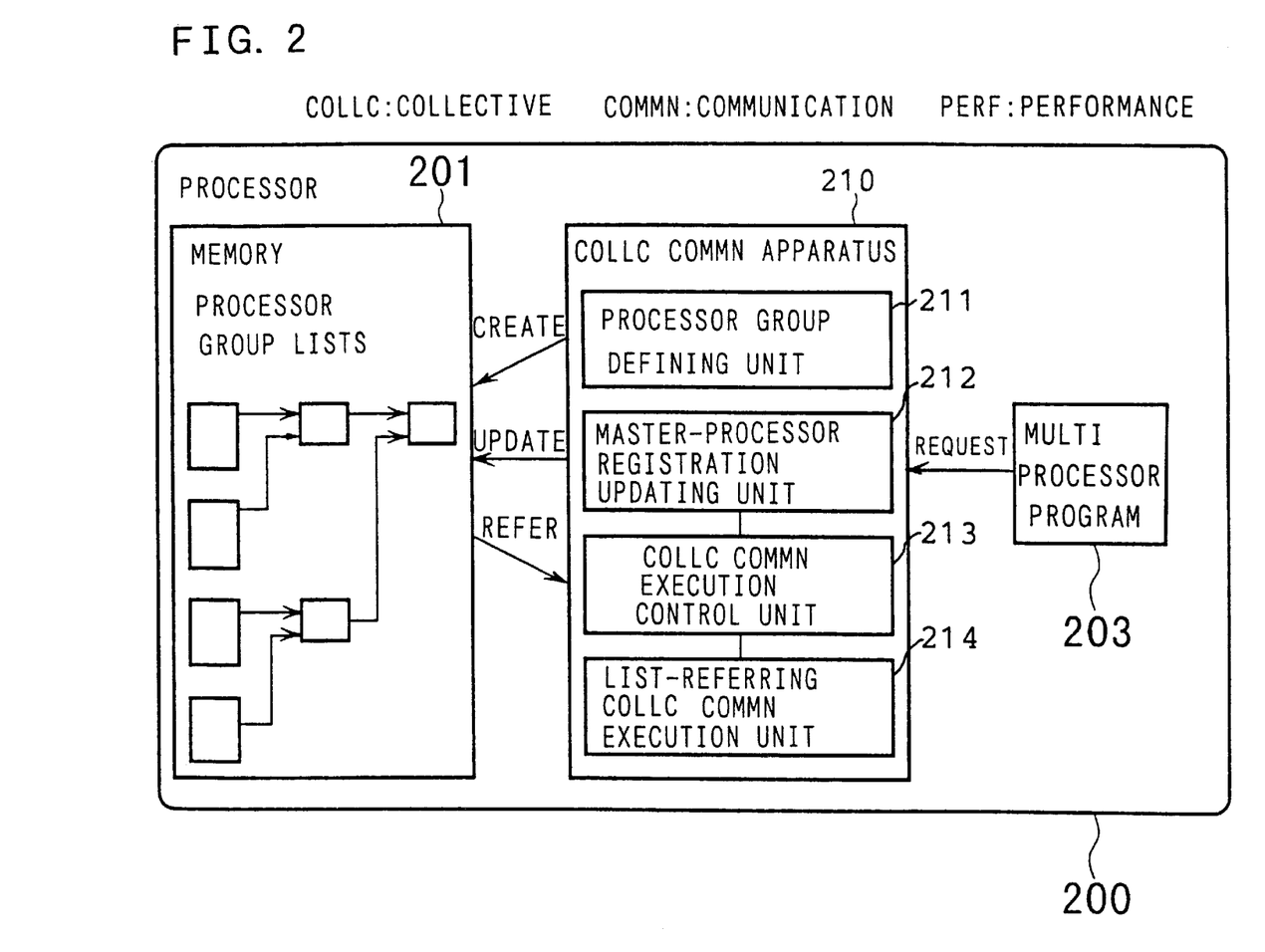
FIG. 2 is a diagram showing the construction of each processor in this mode of practicing the present invention.

FIGS. 1 and 2 are diagrams for describing the implementation of a mode of practicing a data communication method. As shown in FIG. 1, this mode of practicing the invention includes a plurality of processors 11 (16 processors represented by a through p) interconnected by communication paths 12, 13, 14 of different data transfer performances denoted by performance levels 1, 2 and 3, respectively. In the example of FIG. 1, there is a processor group comprising processors –d, a processor group comprising processors e–h, a processor group comprising processors i–l and a processor group comprising processors m–p. The four processors within each group are connected via communication paths 12 of performance level 1. Single processors belonging to the first two groups of the four processor groups are connected together by a communication path 13 of performance level 2 to form one group, and single processors belonging to the second two groups of the four processor groups are connected together by another communication path 13 of performance level 2 to form another group, for a total of two groups. Single processors belonging to these two groups are connected together via a communication path 14 of performance level 3. It should be noted that performance level 1 is higher than performance level 2, and performance level 2 is higher than performance level 3.

According to this mode of the invention as shown in FIG. 2, each processor, here designated at 200, has a memory 201 and includes, as means for implementing a collective communication apparatus 210:

(a) a processor group defining unit 211 which divides all processors that execute a multiprocessor program into groups according to the performance levels of the communication paths interconnecting the processors, and creating a list or lists of the processor groups in the memory 201;

(b) a master-processor registration updating unit 212 which, when a collective communication request is actually issued, updates the processor group lists by making master processors those processors that have been specified as being root processors by the request;

(c) a collective communication execution control unit 213 which, depending upon whether a collective communication request is of the scatter or gather type, delivers the processor group lists in the order of decreasing performance level or in the order of increasing performance level; and (d) a list-referring collective communication execution unit 214 which, on the basis of a designated list, performs collective communication using the binary-tree approach.

Operation according to this mode of practicing the invention will be described in detail with reference to FIGS. 2 and 3.

The processor group defining unit 211 creates, in the memory 201, group lists as groups of processors connected by the communication paths of highest speed, namely of performance level 1, from among the communication paths of the multiprocessor system shown in FIG. 1. The processors grouped are all processors that participate in program execution. Next, the processor group defining unit 211 decides a master processor in each processor group and forms the master processors into groups in each of which the master processors are connected by any of the communication paths of the next highest speed, namely of performance level 2. The processor group defining unit 211 then decides a master processor in each of these groups of the performance level 2 and further forms a group list corresponding to performance level 3.

This determination of the master processors is provisional and may be updated by the master-processor registration updating unit 212, the function of which is implemented subsequently.

Figure 3:
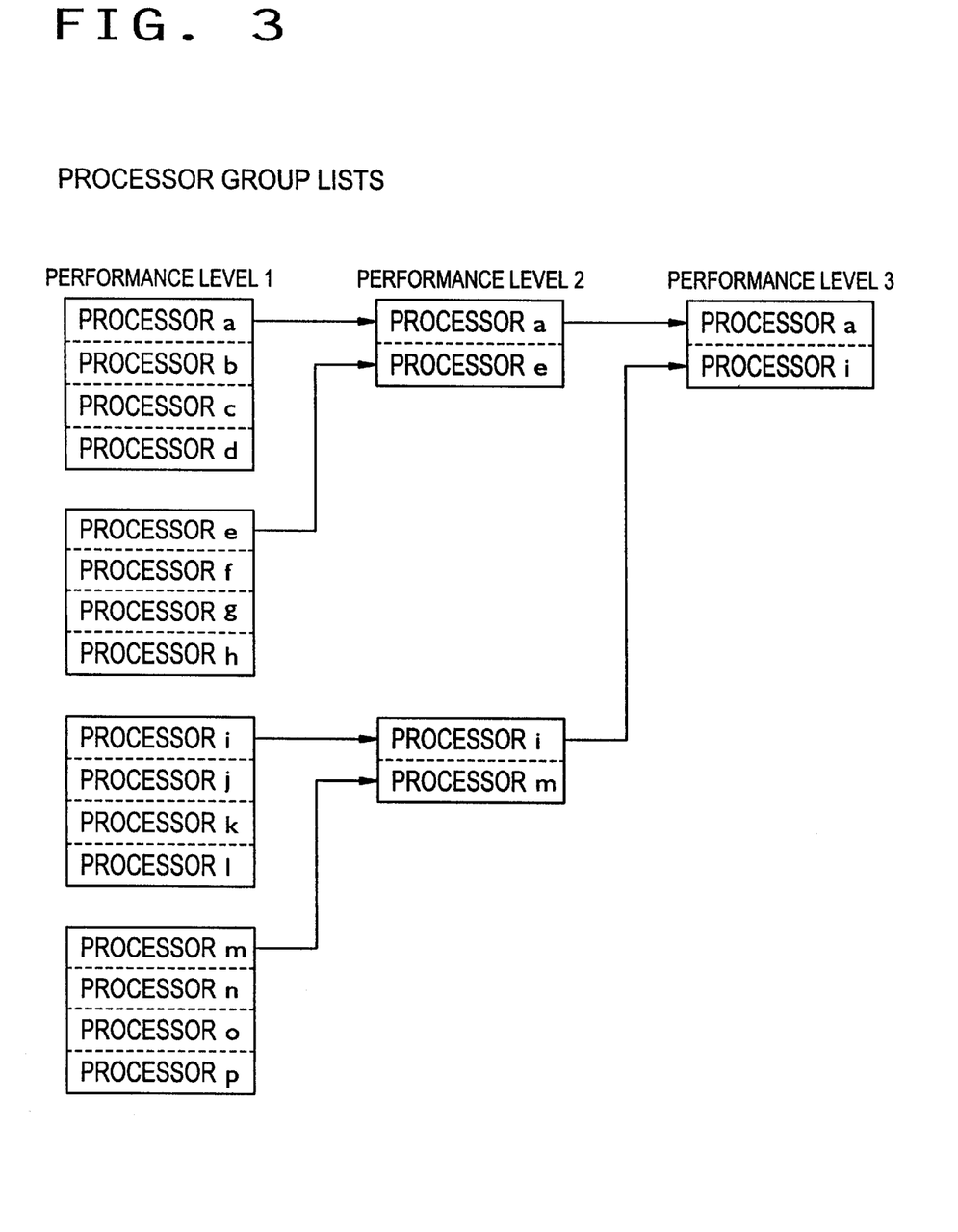
FIG. 3 is a diagram, which is useful in describing the mode of practicing the invention, showing processor group lists created in memory.

The processor group lists thus created in the multiprocessor system of FIG. 1 are as shown in FIG. 3. Each list is created in the memory of each processor. As shown in FIG. 3, there are four processor groups in each of which the processors are connected by the communication path of performance level 1. The processors a, e, i and m are selected as master processors from the respective groups connected at performance level 1. From the processors a, e, i and m, groups in which the processors are connected by the communication paths of performance level 2 (second highest speed) are formed and a master processor is decided from each of the groups thus formed. That is, the processors a and i are selected as master processors from respective groups connected at performance level 2, and the processors a and i are interconnected by the communication path of performance level 3.

The time needed to execute collective communication can be shortened further by executing the processing for creating the processor group lists not when a communication request is issued from the multiprocessor program but when processors that participate in program execution are decided upon after the start of program execution.

Further, any one processor may create the processor group lists and distribute the lists to the other processors. Alternatively, all processors may create each of the processor group lists.

For example, if memory 201 functions as a shared memory, and it is possible for a plurality of processors to refer to one processor group list, then it will suffice if one specific processor creates the processor group lists.

Next, when a collective communication request has been issued by the multiprocessor program 203, the master-processor registration updating unit 212 of all processors participating in collective communication performs an updating operation if updating is necessary. Specifically, if, based upon the designation of a root processor specified by the communication request, a provisionally decided master processor is different from a root processor in the lists containing root processors included in the lists of performance level 1 from among the processor group lists created by the processor group defining unit 211,the master-processor registration updating unit 212 performs updating in regard to the performance-level-2 lists onward to make this master processor the root processor.

In a case where the processor group lists are placed in a shared memory and are shared by a plurality of processors, the updating is carried out by any processor among the plurality of processors, and the other processors wait while monitoring the updating operation.

After the processor group lists have been updated, the collective communication execution control unit 213 determines whether the collective communication requested is of the scatter type or gather type. The collective communication execution control unit 213 delivers the lists to the list-referring collective communication execution unit 214 in order of increasing performance, i.e., in the order of performance levels 3, 2, 1, in case of scatter-type communication, and in order of decreasing performance, i.e., in the order of performance levels 1, 2, 3, in case of gather-type communication, thereby instructing the list-referring collective communication execution unit 214 to perform collective communication.

The list-referring collective communication execution unit 214 so instructed performs collective communication with the other processors in the list in line with the communication request if its own processor is included in any of the lists. If its own processor is not included in any of the lists, the list-referring collective communication execution unit 214 waits for the next indication from the collective communication execution control unit 213.

A preferred embodiment of the present invention will now be described in greater detail with reference to the drawings.

Figure 4:
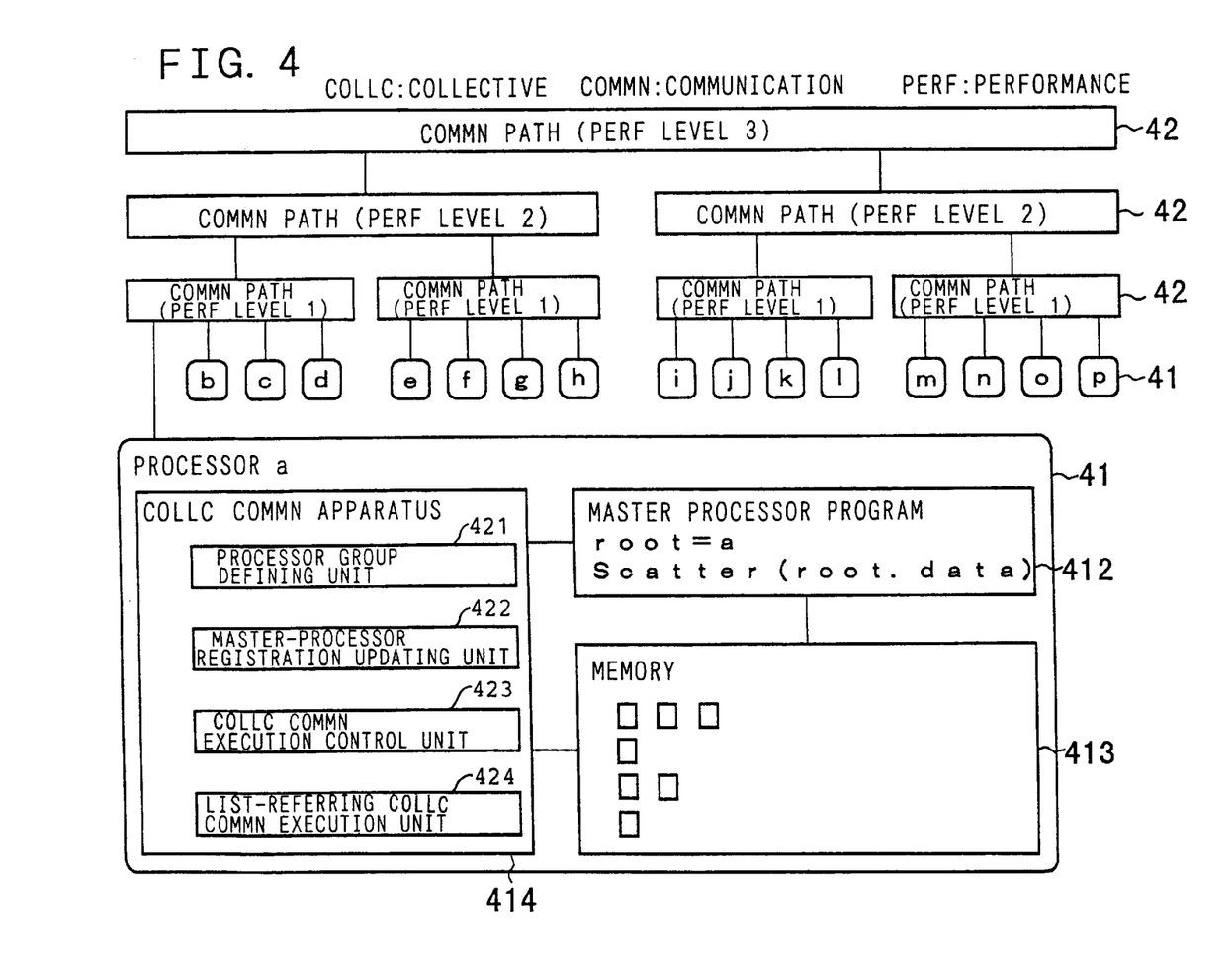
FIG. 4 is a diagram showing the configuration of a system according to an embodiment of the present invention.

FIG. 4 is a diagram useful in describing a preferred embodiment of a collective communication apparatus in a multiprocessor system according to the present invention.

As shown in FIG. 4, there are 16 processors a through p connected by communication paths 42 of performance levels 1 through 3. The processors are identically constructed (only processor a is illustrated in FIG. 4 and the components of the other processors are not shown) and each implements the function of a collective communication apparatus 414, the construction of which has been described with reference to FIG. 2, and has a multiprocessor program 412 and a memory 413.

The collective communication apparatus 414 of each processor has a processor group defining unit 421 which groups the processors connected depending upon three performance levels (1, 2, 3) and generating processor group lists in the memory 413; a master-processor registration updating unit 422 which updates the group lists in memory 413 by master processors decided when communication is requested; a collective communication execution control unit 423 which decides list processing order depending upon whether a collective communication request is of the scatter or gather type; and a list-referring collective communication execution unit 424 which, on the basis of a designated list, performs collective communication with the collective communication apparatuses of the other processors. The multiprocessor program 412 includes a scatter-type communication request which sends a command indicative of the same root processor to the collective communication apparatus (in collective communication specifications the command is the same for all processors).

The operation of this embodiment will now be described in detail.

In response to execution of the multiprocessor program 412 [inclusive of the command Scatter (root, data) which scatters data, where the root is made a], the collective communication apparatus 414 of each processor generates processor group lists in the memory 413 using all processors that participate in program execution. The lists are formed into groups according to the performance levels of the communication paths connecting the processors. This processing will be described in detail with reference to FIGS. 3 and 4.

First, processors connected to the communication paths having the highest speed (highest performance level) in the multiprocessor system are formed into groups and the corresponding lists are created in the memory 413. More specifically, in the case of the system exemplified in FIG. 4, a list is generated in which the processors a, b, c, d constitute one group because they are connected by the communication path in which performance level 1 is indicative of the highest speed. Similarly, and for the same reason, lists are formed in which processors e, f, g, h, processors i, j, k, 1 and processors m, n, o, p constitute the respective groups. Thus, a total of four group lists are generated.

Next, a master processor is selected from each of the four groups, and the selected master processors, which are connected by communication paths of the next highest speed (i.e., of performance level 2, which is the next highest level after level 1), are formed into groups.

The determination of the master processors at this time is provisional and may be rewritten by the master-processor registration updating unit 422 that functions when a communication request is issued.

In the example shown in FIG. 3, the processors a, e, i, m are selected as the master processors from the lists of performance level 1. Since these selected master processors are connected by communication paths of performance level 2, lists of the two processor groups a, e and i, m are generated. A master processor is further selected from each of the two groups of performance level 2 and a list of this group of processors, which are connected by the communication path of performance level 3, is generated.

In the example of FIG. 3, the processors a and i are selected as master processors and a group list of the processor connected by the communication path of level 3 is created. However, the processors e and m may be selected as the master processors and a list of these processors may be generated. This selection of the master processors is provisional and may be changed by the master-processor registration updating unit 422 in dependence upon the indication given by the communication request.

The foregoing relates to the operation of the processor group defining unit 421. The processor group defining unit 421 carries out the above-described processing only once after the processors that will participate in execution of the multiprocessor program have been decided, which takes place following the start of execution of the program. In other words, the processor group defining unit 421 does not operate every time collective communication is requested.

The master-processor registration updating unit 422 performs list updating if, based upon the designation of a root processor in a communication request from the multiprocessor program, a processor provisionally decided upon as being a master processor differs from the root processor in a list that has been created by the processor group defining unit 421.

In the example shown in FIG. 4, the root processor designated corresponds to processor a. In this case, therefore, the processor matches the processor provisionally decided upon as indicated in the list shown in FIG. 3 and, hence, no updating is carried out. However, consider a case where processor g, for example, has been designated as the root processor. Since processor e was selected as the master processor from the group containing processor g among the groups of performance level 1, in this case processor e is rewritten to give processor g in the list of performance level 2.

Furthermore, with regard also to the list of performance level 3 created from the lists of performance level 2, processor a is rewritten to processor g by giving priority to the root processor when performing the selection of the master processor.

After the master-processor registration updating unit 422 performs master processor updating giving priority to the processor designated as being the root processor, the collective communication execution control unit 423 delivers the lists to the list-referring collective communication execution unit 424 in an order that depends upon whether the collective communication request is of the scatter or gather type, i.e., in order of increasing performance level in case of scatter communication and in order of decreasing performance level in case of gather communication.

If its own processor is included in the list, the list-referring collective communication execution unit 424 performs collective communication with the other processors in the list using the binary-tree method.

Thus, the data possessed by the processor a, which is the root processor, is scattered to the other processors by the scatter-type collective communication request from the multiprocessor program. This is shown in FIG. 5.

Figure 5:
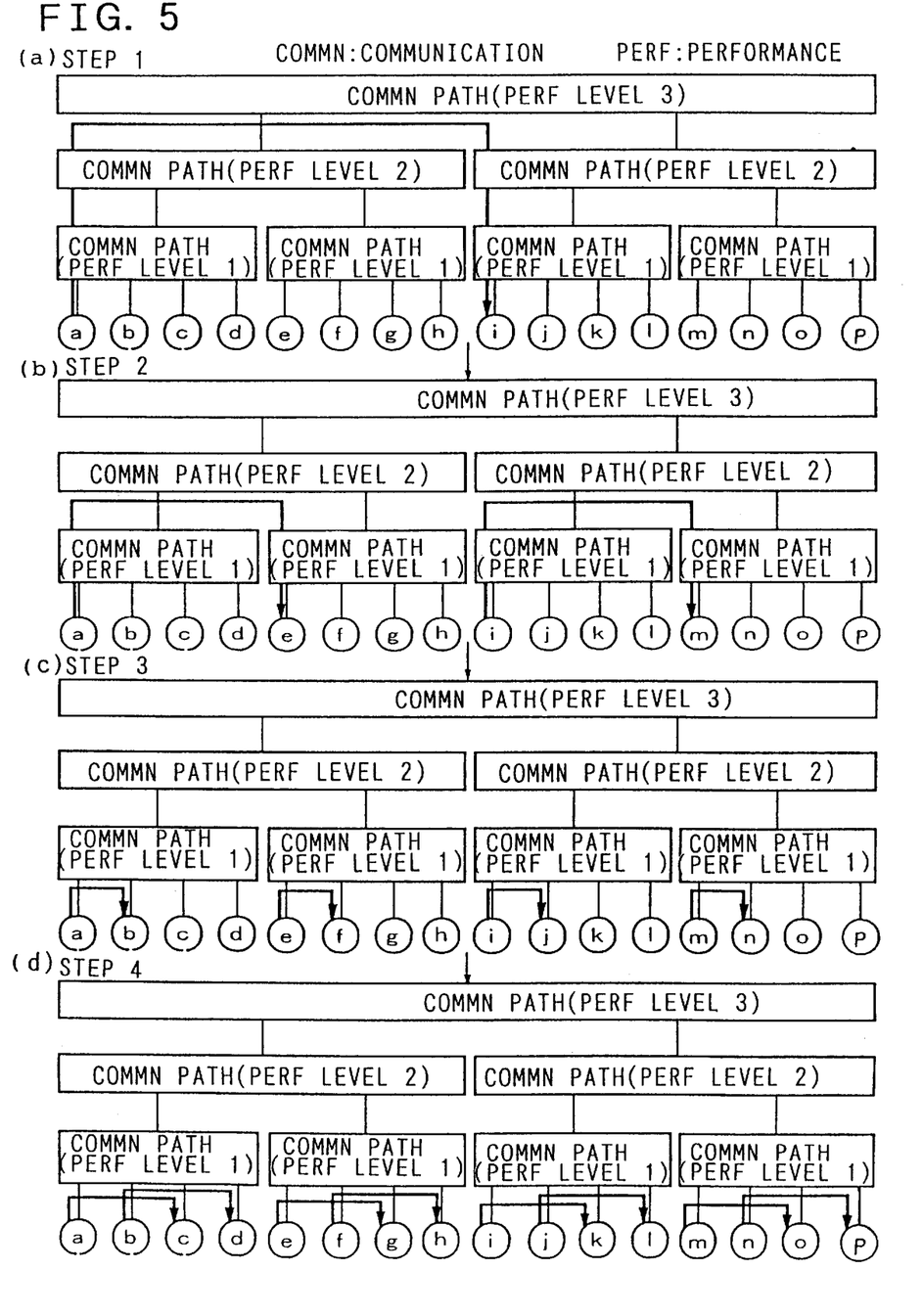
FIG. 5 is a diagram, which is useful in describing the operation of the is embodiment, showing schematically the movement of data in scatter collective communication.

As will be understood from FIG. 5, the transfer of data using the communication path of lowest performance (performance level 3) is carried out at step 1 and is performed only between processors a and i. The transfer of data using the communication paths of next lowest performance (performance level 2) is carried out at step 2. Though transfer is performed two times, namely between processors a and e and between processors i and m, the two communication operations do not interfere with each other and can be performed in parallel because the two communication paths of performance level 2 are independent of each other. That is, the collective communication request is of the scatter type. At step 1, therefore, communication is performed between the processors a and i in one group list of low performance, namely between the processors using the communication path of performance level 3 shown in FIG. 3. At step 2, collective communication is performed between processors a and e and between processors i and m in the group lists of performance level 2 in FIG. 3. At steps 3 and 4, collective communication is performed within each of the groups that use the communication paths of performance level 1. In the case of gather-type communication, collective communication is carried out in the order of decreasing performance, namely from the group lists of higher performance to the group list of lower performance. In other words, collective communication is performed in order starting from step 4 in FIG. 5.

Figure 6:
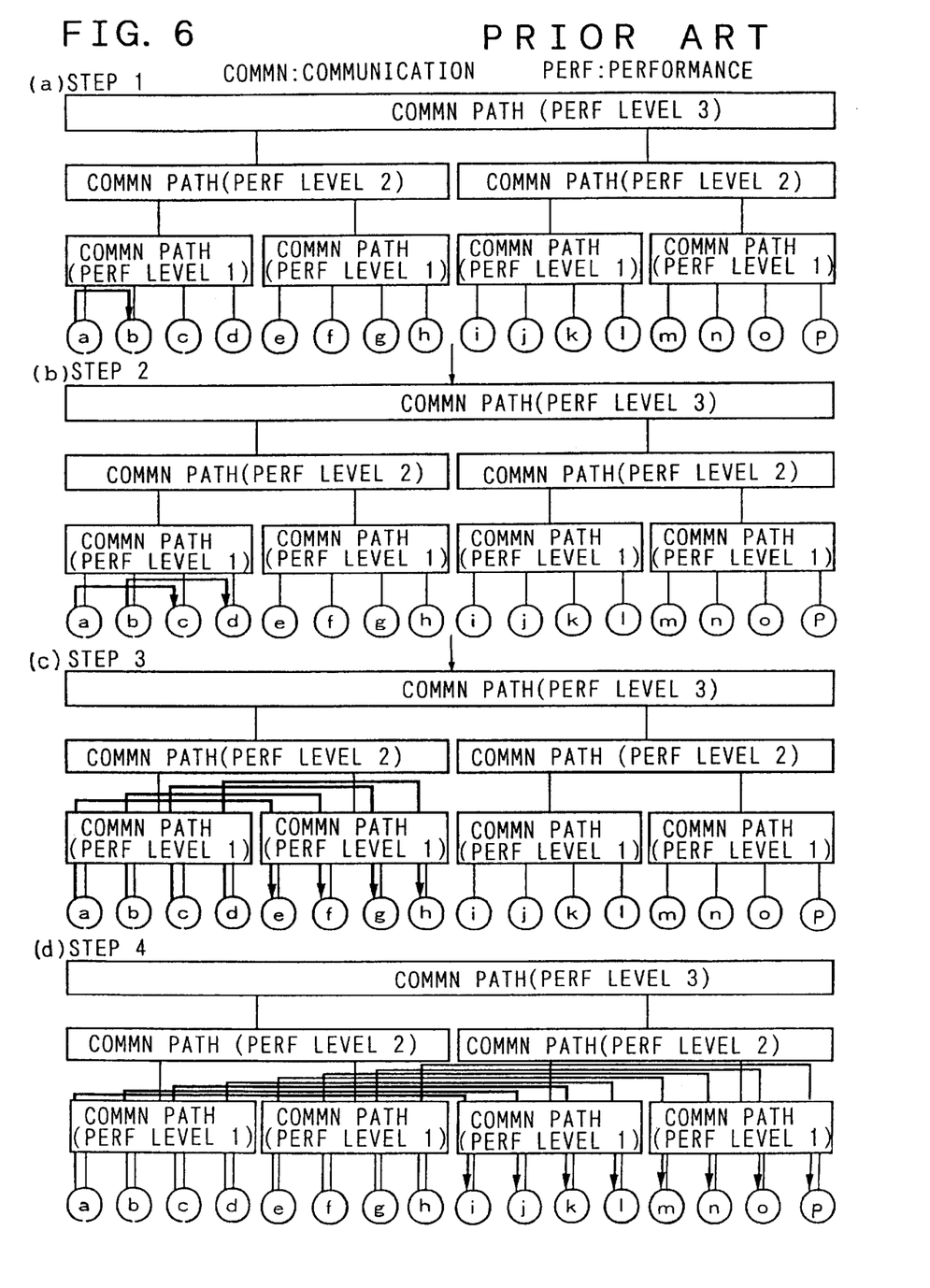
FIG. 6 is a diagram for the sake of comparison showing schematically the movement of data in scatter collective communication in a case where the prior art is applied.

By way of comparison, FIG. 6 illustrates the manner in which the binary-tree method is merely applied to all processors of a multiprocessor system to scatter data from one processor to all processors when scatter collective communication similar to that described above is carried out in the prior art.

As will be appreciated from FIG. 6, the prior art approach is such that four data transfers occur simultaneously, namely between processors a and e, processors b and f, processors c and g, and processors d and h that use one communication path, the performance level of which is 2. Since these data transfers interfere with one another, communication time is prolonged. Similarly, data transfers using the communication path of performance level 3 also occur between eight pairs of processors, thereby prolonging communication time even further.

Thus, in accordance with the present invention as described above, communication using communication paths of low performance can be reduced in a case where collective communication is carried out in a multiprocessor system in which processors are connected by communication paths having various performance levels. As a result, it is possible to improve the performance of collective communication.

The reason for the foregoing is that processor groups are generated according to performance levels and collective communication is subdivided on a per-group basis. This makes it possible to reduce communication using communication paths of low performance.

As many apparently widely different embodiments of the present invention can be made without departing from the spirit and scope thereof, it is to be understood that the invention is not limited to the specific embodiments thereof.

What is claimed is:

1. A collective communication apparatus in a multiprocessor system constituted by a plurality of processors connected by communication paths, said communication paths having various performance levels, comprising:

(a) a processor group defining unit for defining sets of processors or previously decided master processors, which participate in program execution and which are connected by communication paths of equal performance levels when a multiprocessor program is executed, as processor groups in dependence upon the performance levels of the communication paths, and creating processor group lists on a per-performance level basis upon deciding a provisional master processor in any of the groups of processors;

(b) a master-processor registration updating unit for updating the created processor group lists in such a manner that a root processor specified by a collective communication request will become a master processor;

(c) a collective communication execution control unit for presenting the processor group lists in order of increasing performance, namely from lists of groups of processors connected by communication paths of lower performance to lists of groups of processors connected by communication paths of higher performance, if the collective communication request is a scatter request, and in order of decreasing performance, namely from lists of groups of processors connected by communication paths of higher performance to lists of groups of processors connected by communication paths of lower performance, if the collective communication request is a gather request; and (d) a list-referring collective communication execution unit for referring to the lists delivered from said collective communication execution control means and, if a processor containing said list-referring collective communication execution unit is included in any of the lists, performing collective communication with all processors included in the list.

2. A collective communication apparatus in a multiprocessor system constituted by a plurality of processors connected by communication paths, said communication paths having various performance levels, wherein each processor comprises:

(a) a processor group defining unit for defining processor groups, each of said groups comprising processors capable of implementing data transfer on a communication path of equal performance level, from the plurality of processors connected by the communication paths having various performance levels, and creating lists of the processor groups on a per-performance basis in terms of the performance of the communication paths;

(b) a collective communication execution control unit for controlling and deciding, in dependence upon a type of collective communication and on the basis of the lists, the order in which communication is executed; and (c) a list-referring collective communication execution unit for referring to the lists and performing collective communication with the processors in accordance with the order controlled and decided by said collective communication execution control unit.

3. The apparatus according to claim 2, wherein said collective communication execution control unit controls execution of communication in order of increasing performance, namely from a list or lists of groups of processors connected by a communication path or paths of lower performance to a list or lists of groups of processors connected by a communication path or paths of higher performance, if a collective communication request is a scatter request, and in order of decreasing performance, namely from a list or lists of groups of processors connected by a communication path or paths of higher performance to a list or lists of groups of processors connected by a communication path or paths of lower performance, if the collective communication request is a gather request.

4. The apparatus according to claim 1, wherein said list-referring collective communication execution unit performs collective communication with other processors in the lists by using a binary-tree method.

5. The apparatus according to claim 2, wherein if a processor containing said list-referring collective communication execution unit is included in any of the lists, said list-referring collective communication execution unit performs collective communication with other processors in the lists by using a binary-tree method.

6. The apparatus according to claim 2, wherein said processor group defining unit forms group lists hierarchically by selecting one master processor from each of the groups comprising a plurality of processors connected by a communication path or paths of highest performance, forming groups of these master processors interconnected by a communication path or paths of the next highest performance, selecting one master processor from each of said processor groups and interconnecting these selected master processors by a communication path or paths of the next highest performance.

7. The apparatus according to claim 6, further comprising a master-processor registration updating unit for updating the master processors in the lists based upon a designated root processor.

8. A collective communication method in a multiprocessor system constituted by a plurality of processors connected by communication paths, said communication paths having various performance levels, the method comprises:

(a) a processor group defining step which defines sets of processors or previously decided master processors, which participate in program execution and which are connected by communication paths of equal performance levels when a multiprocessor program is executed, as processor groups in dependence upon the performance levels of the communication paths, to create processor group lists on a per-performance level basis upon deciding a provisional master processor in any of the groups of processors;

(b) a master-processor registration updating step which updates the created processor group lists in such a manner that a root processor specified by a collective communication request will become a master processor;

(c) a collective communication execution control step which presents the processor group lists in order of increasing performance, namely from lists of groups of processors connected by communication paths of lower performance to lists of groups of processors connected by communication paths of higher performance, if the collective communication request is a scatter request, and in order of decreasing performance, namely from lists of groups of processors connected by communication paths of higher performance to lists of groups of processors connected by communication paths of lower performance, if the collective communication request is a gather request; and (d) a list-referring collective communication execution step which refers to the lists delivered from said collective communication execution control step and, if a processor which performs said list-referring collective communication execution step is included in any of the lists, performs collective communication with all processors included in the list.

9. A collective communication method in a multiprocessor system constituted by a plurality of processors connected by communication paths, said communication paths having various performance levels, wherein in each processor the following steps are executed:

(a) a processor group defining step which defines processor groups, each of said groups comprising processors capable of implementing data transfer on a communication path of equal performance level, from the plurality of processors connected by the communication paths having various performance levels, to create lists of the processor groups on a per-performance basis in terms of the performance of the communication paths;

(b) a collective communication execution control step which controls and decides, in dependence upon a type of collective communication and on the basis of the lists, the order in which communication is executed; and (c) a list-referring collective communication execution step which refers to the lists and performs collective communication with the processors in accordance with the order controlled and decided by said collective communication execution control step.

* * * * *